(12) United States Patent
Okabe

(10) Patent No.: US 8,875,756 B2
(45) Date of Patent: Nov. 4, 2014

(54) PNEUMATIC TIRE

(75) Inventor: Hidetoshi Okabe, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 294 days.

(21) Appl. No.: 13/325,165

(22) Filed: Dec. 14, 2011

(65) Prior Publication Data

US 2012/0160382 A1 Jun. 28, 2012

(30) Foreign Application Priority Data

Dec. 27, 2010 (JP) ................................. 2010-291086
Oct. 4, 2011 (JP) ................................. 2011-220458

(51) Int. Cl.
*B60C 11/01* (2006.01)
*B60C 11/04* (2006.01)

(52) U.S. Cl.
CPC ........... *B60C 11/01* (2013.01); *B60C 2011/013* (2013.01); *B60C 11/04* (2013.01); *B60C 2011/0348* (2013.01); *B60C 2011/0355* (2013.01)
USPC ............. 152/209.15; 152/209.16; 152/209.27

(58) Field of Classification Search
CPC .............. B60C 11/01; B60C 2011/013; B60C 2011/0348
USPC .............. 152/209.15, 209.16, 209.26, 209.27
See application file for complete search history.

(56) References Cited

U.S. PATENT DOCUMENTS

| | | | |
|---|---|---|---|
| 4,630,661 A | * | 12/1986 | Stelzer ...................... 152/209.21 |
| 4,739,812 A | * | 4/1988 | Ogawa et al. ............ 152/209.14 |
| 5,833,780 A | * | 11/1998 | Kishi et al. .............. 152/209.23 |
| 5,896,905 A | * | 4/1999 | Lurois ...................... 152/209.23 |
| 2003/0005992 A1 | | 1/2003 | Radulescu |
| 2008/0173380 A1 | | 7/2008 | Ohara |

FOREIGN PATENT DOCUMENTS

| | | | |
|---|---|---|---|
| GB | 2170153 | * | 7/1986 |
| JP | H06-320914 | | 11/1994 |
| JP | 07-017215 | * | 1/1995 |
| JP | H07-017215 | | 1/1995 |
| JP | 10071811 | | 3/1998 |
| JP | 11-198607 | * | 7/1999 |
| JP | 2000-185522 | | 7/2000 |
| JP | 2002-079809 | | 3/2002 |
| JP | 2008-174112 | | 7/2008 |

OTHER PUBLICATIONS

English machine translation of JP11-198607, dated Jul. 1999.*
English machine translation of JP07-017215, dated Jan. 1995.*

* cited by examiner

*Primary Examiner* — Steven D Maki
*Assistant Examiner* — Robert Dye
(74) *Attorney, Agent, or Firm* — Thorpe North & Western LLP

(57) ABSTRACT

A pneumatic tire including a plurality of circumferential main grooves extending in a tire circumferential direction, a plurality of land portions partitioned by the circumferential main grooves, a narrow groove extending in the tire circumferential direction and disposed in an edge portion of a road contact surface side and an outer side in the tire width direction of the shoulder land portion on an outermost side in a tire width direction, and a narrow rib that is partitioned by the narrow groove. The narrow rib includes an offset portion having a road contact surface offset inward in a tire radial direction from the road contact surface of the shoulder land portion, and a protrusion protruding in the tire radial direction from the offset portion, extending in the tire circumferential direction, and having a top surface that is substantially flush with a profile line of the shoulder land portion.

21 Claims, 6 Drawing Sheets

WHEN NEW

INTERMEDIATE PERIOD OF WEAR

| | Conventional Example 1 | Conventional Example 2 | Working Example 1 | Working Example 2 | Working Example 3 | Working Example 4 | Working Example 5 | Working Example 6 | Working Example 7 |
|---|---|---|---|---|---|---|---|---|---|
| Narrow rib protrusion | × | × | Present | Present | Present | Present | Present | Present | Present |
| δ [mm] | - | - | 0 | 0 | 0 | 0 | 0 | -0.5 | 0 |
| Protrusion position | - | - | Inner side edge portion | Inner side edge portion | Inner side edge portion | Inner side edge portion | Inner side edge portion | Inner side edge portion | Outer side edge portion |
| W2/W1 | - | - | 0.3 | 0.3 | 0.3 | 0.3 | 0.3 | 0.3 | 0.3 |
| W3/W2 | - | - | 0.17 | 0.10 | 0.40 | 0.17 | 0.17 | 0.17 | 0.17 |
| W4/W2 | - | - | 0.73 | 0.81 | 0.49 | 0.73 | 0.73 | 0.73 | 0.73 |
| Offset amount g [mm] | 0 | 2.0 | 2.0 | 2.0 | 2.0 | 0.5 | 3.0 | 2.0 | 2.0 |
| Shoulder rib uneven wear resistance performance | 100 | 110 | 120 | 125 | 125 | 120 | 140 | 120 | 120 |

FIG. 9

|  | Working Example 8 | Working Example 9 | Working Example 10 | Working Example 11 | Working Example 12 | Working Example 13 | Working Example 14 | Working Example 15 | Working Example 16 |
|---|---|---|---|---|---|---|---|---|---|
| Narrow rib protrusion | Present | Present | Present | Present | Present | Present | Present | Present | Present |
| δ [mm] | 0.5 | 0 | 0 | 0 | 0 | 0 | 0 | 0 | 0 |
| Protrusion position | Inner side edge portion | Inner side edge portion | Inner side edge portion | Inner side edge portion | Inner side edge portion | Inner side edge portion | Inner side edge portion | Inner side edge portion | Inner side edge portion |
| W2/W1 | 0.3 | 0.2 | 0.4 | 0.3 | 0.3 | 0.3 | 0.3 | 0.3 | 0.3 |
| W3/W2 | 0.17 | 0.17 | 0.17 | 0.80 | 0.20 | 0.25 | 0.07 | 0.43 | 0.17 |
| W4/W2 | 0.73 | 0.73 | 0.73 | 0.10 | 0.70 | 0.65 | 0.83 | 0.47 | 0.73 |
| Offset amount g [mm] | 2.0 | 2.0 | 2.0 | 2.0 | 2.0 | 2.0 | 2.0 | 2.0 | 3.5 |
| Shoulder rib uneven wear resistance performance | 120 | 120 | 110 | 110 | 145 | 150 | 130 | 110 | 110 |

FIG. 10

PNEUMATIC TIRE

PRIORITY CLAIM

Priority is claimed to Japan Patent Application Serial No. 2010-291086 filed on Dec. 27, 2010 and Japan Patent Application Serial No. 2011-220458 filed on Oct. 4, 2011.

BACKGROUND

1. Technical Field

The present technology relates to a pneumatic tire, and more specifically, to a pneumatic tire whereby uneven wear of a shoulder rib can be suppressed.

2. Related Art

Pneumatic tires applied to pneumatic radial tires for heavy loads and the like have a problem in that there is a need to suppress uneven wear (e.g. step wear) of the shoulder rib. Therefore, conventional pneumatic tires include narrow grooves extending in a tire circumferential direction along an edge portion on an outer side in the tire width direction of the shoulder rib, and narrow ribs that are partitioned by the narrow grooves. The narrow ribs are so-called "wear sacrifice ribs", and inhibit uneven wear of the shoulder rib by proactively being worn when the tire is rolling. The technology described in Japanese Unexamined Patent Application Publication (translation of PCT application) No. 2002-512575 is known as a conventional pneumatic tire that is configured in this manner.

SUMMARY

The present technology provides a pneumatic tire by which uneven wear of a shoulder rib can be suppressed. A pneumatic tire according to the present technology includes a plurality of circumferential main grooves extending in a tire circumferential direction, a plurality of land portions partitioned by the circumferential main grooves, a narrow groove extending in the tire circumferential direction and disposed in an edge portion of a road contact surface side and an outer side in the tire width direction of the land portion on an outermost side in a tire width direction (hereinafter referred to as the "shoulder land portion"), and a narrow rib that is partitioned by the narrow groove. The narrow rib includes an offset portion having a road contact surface offset inward in a tire radial direction from the road contact surface of the shoulder land portion, and a protrusion protruding in the tire radial direction from the offset portion, extending in the tire circumferential direction, and having a top surface that is substantially flush with a profile line of the shoulder land portion.

Additionally, with the pneumatic tire according to the present technology, a width W2 of the narrow rib and a width W1 of the road contact surface of the shoulder land portion preferably have a relationship such that $0.20 \leq W2/W1 \leq 0.40$.

Additionally, with the pneumatic tire according to the present technology, a width W3 of the top surface of the protrusion and the width W2 of the narrow rib preferably have a relationship such that $0.10 \leq W3/W2 \leq 0.40$.

Additionally, with the pneumatic tire according to the present technology, a distance δ between the top surface of the protrusion and the road contact surface of the shoulder land portion is preferably within a range of $-0.5 \text{ mm} \leq \delta \leq 0.5 \text{ mm}$.

Additionally, with the pneumatic tire according to the present technology, an offset amount g between the road contact surface of the offset portion and the road contact surface of the shoulder land portion is preferably within a range of $0.5 \text{ mm} \leq g \leq 3.0 \text{ mm}$.

Additionally, with the pneumatic tire according to the present technology, a groove width d of the narrow groove is preferably within a range of $0.1 \text{ mm} \leq d \leq 4.0 \text{ mm}$; and a groove depth h of the narrow groove, with respect to a groove depth H of the circumferential main groove partitioning the shoulder land portion, is preferably within a range of $0.80 \leq h/H \leq 1.10$.

With the pneumatic tire according to the present technology, the protrusion of the narrow rib contacts the ground under conditions when the tire is new and where the road contact surface of the shoulder land portion contacts the ground. Thus, the protrusion functions as a wear sacrifice rib and the functionality of the narrow rib is ensured. This leads to the advantage that uneven wear of the shoulder land portion at the initial period of wear is suppressed from when the tire is new.

BRIEF DESCRIPTION OF THE DRAWINGS

FIGS. 9 and 10 are tables showing the results of performance testing of pneumatic tires according to the embodiment of the present technology.

DETAILED DESCRIPTION

The present technology is explained in detail below with reference to the accompanying drawings. However, the present technology is not limited to this embodiment. Moreover, constituents of the embodiment which can possibly or obviously be substituted while maintaining consistency with the present technology are included. Furthermore, the multiple modified examples described in the embodiment can be combined as desired within a scope apparent to a person skilled in the art.

Pneumatic Tire

Figure 1:
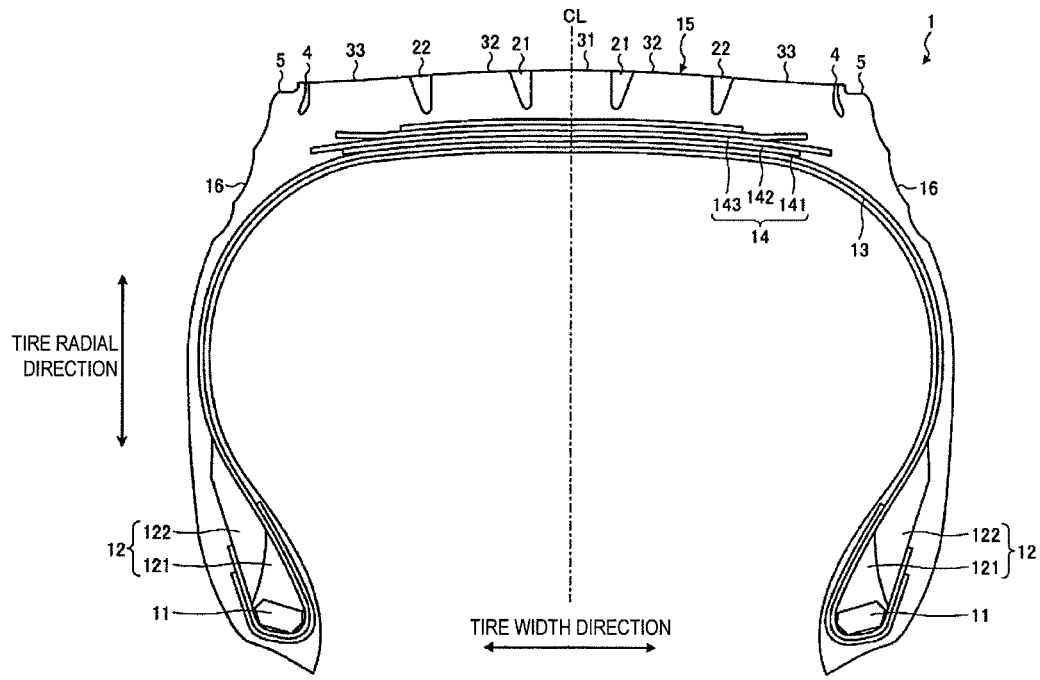
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. As an example of a pneumatic tire, FIG. 1 illustrates a pneumatic radial tire for heavy loads mounted on a steering axle of a long-distance transport vehicle or the like.

A pneumatic tire 1 includes bead cores 11, bead fillers 12, a carcass layer 13, a belt layer 14, tread rubber 15, and side wall rubber 16 (see FIG. 1). The bead cores 11 have a ring structure, and a pair thereof is provided on left and right sides. The bead fillers 12 are formed from an upper filler 122 and a lower filler 121, and are disposed on a periphery of the bead cores 11 in a tire radial direction and reinforce bead portions of the tire. The carcass layer 13 has a single-layer structure, and stretches between the left and right side bead cores 11 and 12 in toroidal form, forming a framework for the tire. Additionally, both ends of the carcass layer 13 are folded toward an outer side in a tire width direction so as to envelop the bead fillers 12, and fixed. The belt layer 14 is formed from a plurality of belt plies 141 to 143 that are laminated, and is disposed on the periphery of the carcass layer 13 in the tire radial direction. These belt plies 141 to 143 are formed by roll processing a plurality of belt cords made from steel fiber material or organic fiber material. The tread rubber 15 is disposed on the periphery of the carcass layer 13 and the belt layer 14 in the tire radial direction, and forms a tread portion of the tire. The side wall rubber 16 is formed from a pair of left and right sides, is disposed on an outer side in the tire width direction of the carcass layer 13, and forms sidewall portions of the tire.

Figure 2:
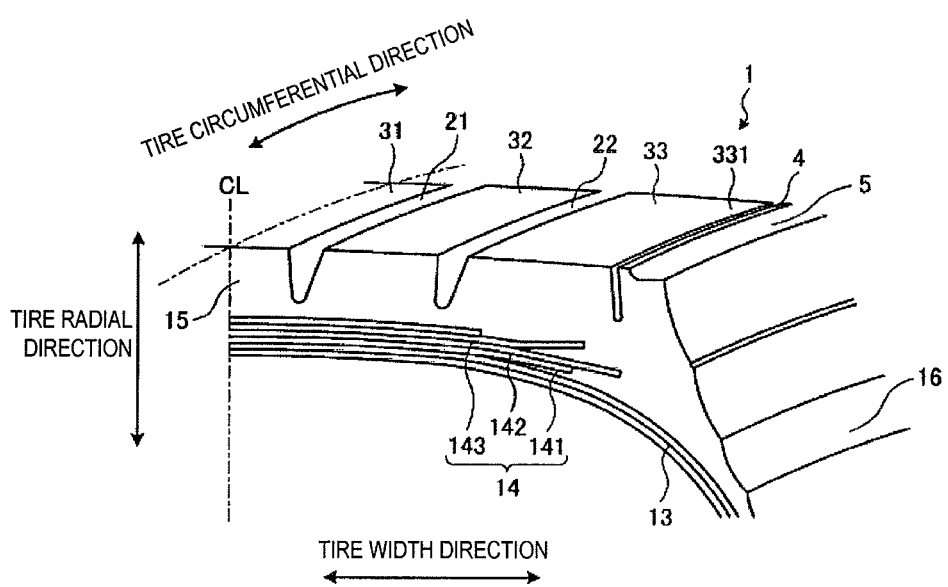
FIG. 2 is an enlarged perspective view illustrating a shoulder portion of the pneumatic tire depicted in FIG. 1.

Additionally, the pneumatic tire 1 includes a plurality of circumferential main grooves 21 and 22 extending in the tire circumferential direction; and a plurality of land portions 31 to 33 partitioned by the circumferential main grooves 21 and 22 in the tread portion (see FIG. 2). For example, in this embodiment, the pneumatic tire 1 has four of the circumferential main grooves 21 and 22 and five of the land portions 31 to 33. Thereby, a left-right symmetric tread pattern based on the rib-like land portions 31 to 33 is formed. Here, the land portion 31 positioned on the tire equator line CL is referred to as "central land portion", and the left and right land portions 32, 32 adjacent to the central land portion are referred to as "second land portions". Furthermore, the left and right land portions 33, 33 positioned on outermost sides in the tire width direction are referred to as "shoulder land portions".

Narrow Rib of the Shoulder Land Portion

Figure 3:
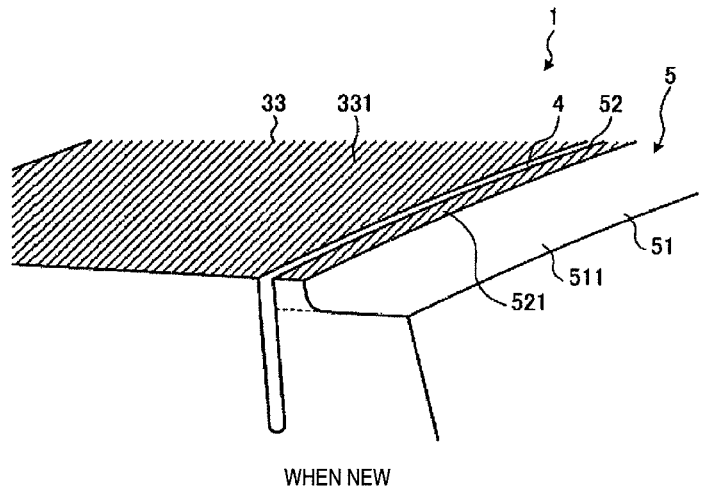
FIG. 3 is an enlarged perspective view illustrating a narrow rib of the pneumatic tire depicted in FIG. 1.
Figure 4:
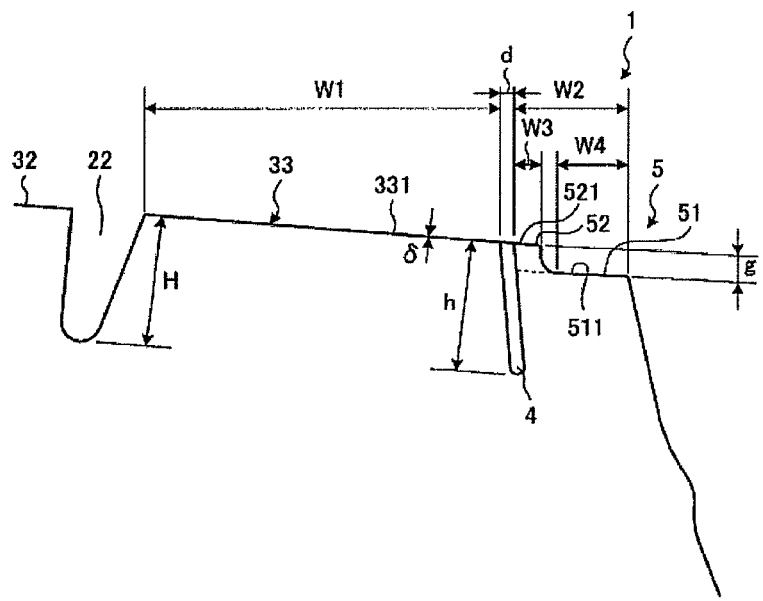
FIG. 4 is a cross sectional view in a tire meridian direction illustrating the narrow rib of the pneumatic tire depicted in FIG. 1.
Figure 5:
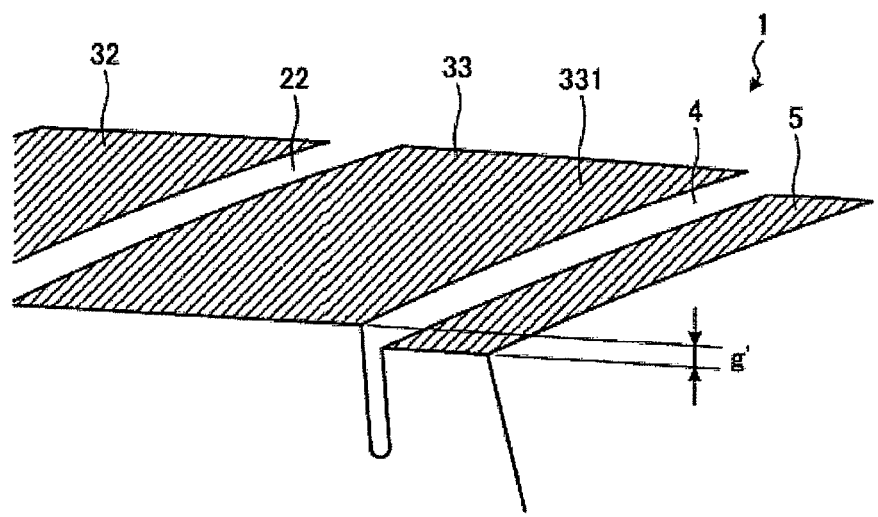
FIG. 5 is an explanatory drawing illustrating the effect of the narrow rib of the pneumatic tire depicted in FIG. 1.
Figure 6:
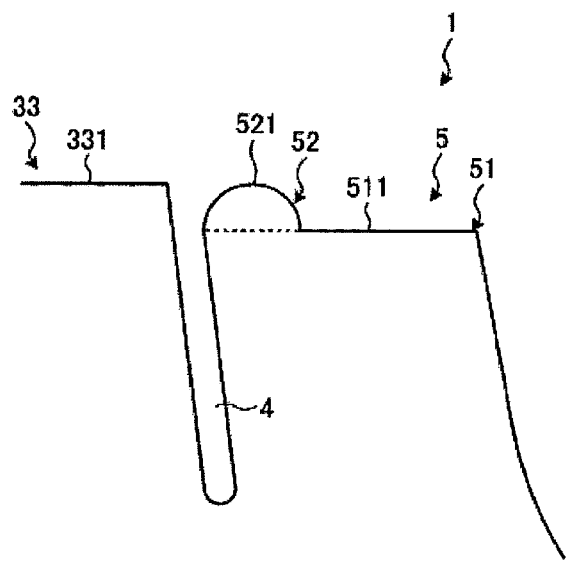
FIG. 6 is an explanatory view illustrating a modified example of the pneumatic tire depicted in FIG. 1.
Figure 7:
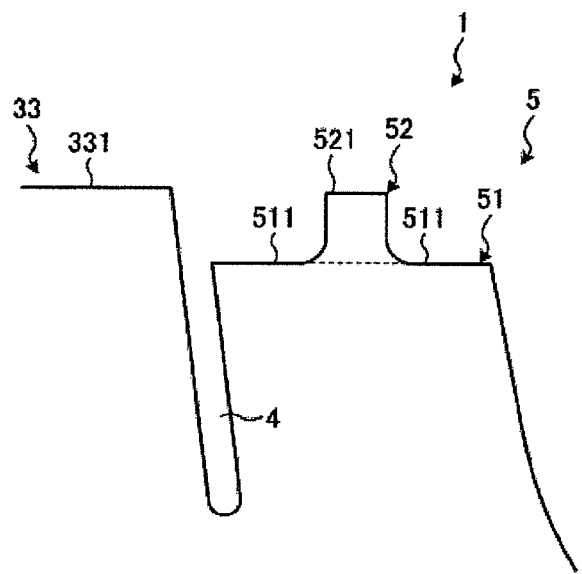
FIG. 7 is an explanatory view illustrating a modified example of the pneumatic tire depicted in FIG. 1.
Figure 8:
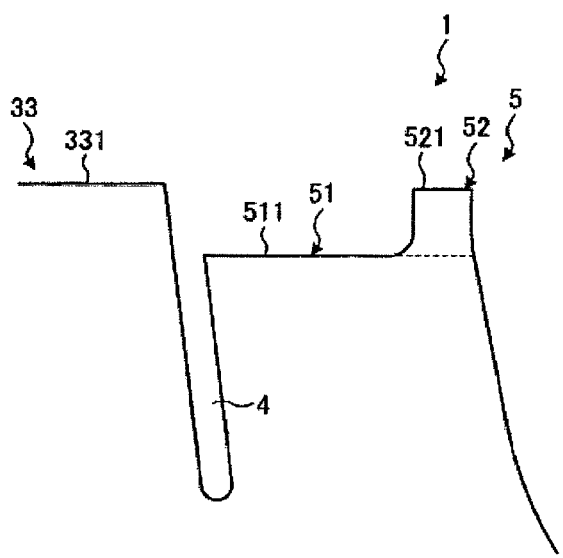
FIG. 8 is an explanatory view illustrating a modified example of the pneumatic tire depicted in FIG. 1.

FIG. 2 is an enlarged perspective view illustrating a shoulder portion of the pneumatic tire depicted in FIG. 1. FIG. 3 is an enlarged perspective view illustrating a narrow rib of the pneumatic tire depicted in FIG. 1. FIG. 4 is a cross sectional view in a tire meridian direction illustrating the narrow rib of the pneumatic tire depicted in FIG. 1. FIG. 5 is an explanatory drawing illustrating the effect of the narrow rib of the pneumatic tire depicted in FIG. 1. FIGS. 6 to 8 are explanatory views depicting modified examples of the pneumatic tire shown in FIG. 1. In these drawings, FIGS. 2 to 4 and FIGS. 6 to 8 are illustrations of the tire when it is new; and FIG. 5 illustrates an intermediate period of wear after 80,000 km of traveling.

The pneumatic tire 1 includes a narrow groove 4 and a narrow rib 5 that is partitioned by the narrow groove 4 in the shoulder land portion 33 (see FIG. 2).

The narrow groove 4 is disposed in an edge portion of a road contact surface side and an outer side in the tire width direction of the shoulder land portion 33, and extends in the tire circumferential direction (see FIGS. 2 and 3). Here, a groove width d of the narrow groove 4 is configured to be within a range of 0.1 mm≤d≤4.0 mm (see FIG. 4). Additionally, a groove depth h of the narrow groove 4, with respect to a groove depth H of the circumferential main groove 22 partitioning the shoulder land portion 33, is configured to be within a range of 0.80≤h/H≤1.10. Thereby, a form of the narrow rib 5 is made appropriate. Additionally, in this embodiment, when viewed as a cross-section in the tire meridian direction, the narrow groove 4 inclines toward the outer side in the tire width direction in a groove depth direction. Therefore, the shoulder land portion 33 has a trapezoid-shaped cross-section with a width that expands to the inner side in the tire radial direction. Thereby, rigidity of the shoulder land portion 33 is ensured.

Note that the groove depth H of the circumferential main groove 22 and the groove depth h of the narrow groove 4 are distances from the road contact surface 331 of the shoulder land portion 33 to a groove bottom.

The narrow rib 5 is a so-called "wear sacrifice rib", and inhibits uneven wear (e.g. step wear) of the shoulder land portion 33 by proactively being worn when the tire is rolling. The narrow rib 5 is partitioned from the shoulder land portion 33 by the narrow groove 4, and extends in the tire circumferential direction along an edge portion of the shoulder land portion 33 on the outer side in the tire width direction (see FIGS. 2 and 3). Additionally, a width W2 of the narrow rib 5 and a width W1 of the road contact surface 331 of the shoulder land portion 33 have a relationship such that $0.20 \leq W2/W1 \leq 0.40$. Thereby, function of the narrow rib 5 as a wear sacrifice rib is ensured.

Additionally, the narrow rib 5 has an offset portion 51 and a protrusion 52 (see FIGS. 3 and 4).

The offset portion 51 has a road contact surface 511 offset inward in the tire radial direction from the road contact surface 331 of the shoulder land portion 33. The road contact surface 511 of the offset portion 51, when viewed as a cross-section in the tire meridian direction, has a curved form that is substantially parallel to a profile (extended line of the road contact surface 511) of the shoulder land portion 33 (see FIG. 4). Here, these members are considered to be parallel so long as an angle θ (not illustrated) formed by the road contact surface 511 of the offset portion 51 and the profile of the shoulder land portion 33 is within a range of $-5° \leq \theta \leq 5°$. Note that the imaginary line in FIG. 3 illustrates the extended line of the road contact surface 511 of the offset portion 51.

Additionally, the road contact surface 511 of the offset portion 51 has a predetermined offset amount g from the road contact surface 331 of the shoulder land portion 33 (see FIG. 4). The offset amount g is set appropriately, considering a step g' (see FIG. 5) between a contact patch of the narrow rib 5 and a contact patch of the shoulder land portion 33 at an intermediate period of wear. For example, the offset amount g is configured to be within a range of $0.5 \text{ mm} \leq g \leq 3.0 \text{ mm}$.

The protrusion 52 protrudes from the offset portion 51 in the tire radial direction and has a rib-like structure extending in the tire circumferential direction (see FIGS. 2 and 3). Thus, the narrow rib 5 has a step portion formed from a top surface 521 of the protrusion 52 and the road contact surface 511 of the offset portion 51. Additionally, the protrusion 52 protrudes in the tire radial direction from the road contact surface 511 of the offset portion 51 and, therefore, the top surface 521 of the protrusion 52 is more prone to contact a road surface than the road contact surface 511 of the offset portion 51.

Additionally, the protrusion 52 has the top surface 521 on the profile line of the shoulder land portion 33. In other words, the top surface 521 of the protrusion 52 is substantially flush with the road contact surface 331 of the shoulder land portion 33. Specifically, these members are considered to be substantially flush so long as a distance δ between the top surface 521 of the protrusion 52 and the road contact surface 331 of the shoulder land portion 33 is within a range of $-0.5 \text{ mm} \leq \delta \leq 0.5 \text{ mm}$. Additionally, when viewed as a cross-section in the tire meridian direction, the top surface 521 of the protrusion 52 and the extended line of the profile of the shoulder land portion 33 are considered to be substantially parallel so long as an angle φ (not illustrated) formed by the top surface 521 of the protrusion 52 and the road contact surface 331 of the shoulder land portion 33 is within a range of $-5° \leq \phi \leq 5°$. Thereby, the top surface 521 of the protrusion 52 reliably contacts the ground under conditions when the tire is new and where the edge portion on the outer side in the tire width direction of the road contact surface 331 of the shoulder land portion 33 contacts the ground. Specifically, a protrusion amount (position of the top surface 521) of the protrusion 52 is specified so that when the road contact surface 331 of the shoulder land portion 33 contacts the ground, the top surface 521 of the protrusion 52 also contacts the ground.

With the pneumatic tire 1, when the tire is rotating, the rigidity of the narrow rib 5 is less than that of the shoulder land portion 33. Therefore, the narrow rib 5 proactively wears and functions as a wear sacrifice rib (see FIGS. 2 and 3). Thereby, uneven wear of the main body (the shoulder land portion 33) is suppressed. Additionally, at an intermediate period of wear, the contact patch of the narrow rib 5 and the contact patch of the shoulder land portion 33 wear uniformly while maintaining a set step g' (see FIG. 5). Moreover, function of the narrow rib 5 as a wear sacrifice rib is appropriately ensured due to the narrow rib 5 wearing in a consistent form.

On the other hand, with a configuration where the narrow rib does not include the protrusion (see, for example, Japanese Unexamined Patent Application Publication (translation of PCT application) No. 2002-512575), the road contact surface of the narrow rib and the road contact surface of the shoulder land portion have a set step when the tire is new. In this configuration, if there are variations in usage conditions of the tire (e.g. air pressure, load, state of maintenance, etc.), the narrow rib may not contact the ground from when the tire is new in an initial period of wear. In this case, there will be problems in that the narrow rib will not function as a wear sacrifice rib and uneven wear will occur in the shoulder land portion. On the other hand, there is a problem that configuring the road contact surface of the narrow rib so as to definitely contact the ground while having a step between the road contact surface of the narrow rib and the road contact surface of the shoulder land portion when the tire is new is extremely difficult in the case of taking into account variation in usage conditions of the tire.

Regarding this point, with the pneumatic tire 1, the narrow rib 5 has the protrusion 52 for contacting the ground when the tire is new (see FIGS. 2 to 4) and, therefore, the protrusion 52 functions as a wear sacrifice rib. This leads to the function of the narrow rib 5 being ensured and uneven wear of the shoulder land portion 33 being suppressed from when the tire is new in an initial period of wear. Moreover, the consistent form described above of the narrow rib 5 is obtained due to the protrusion 52 wearing and disappearing while nearing the intermediate period of wear (see FIG. 5). Additionally, with the pneumatic tire 1, the narrow rib 5 reliably contacts the ground when the tire is new due to having the protrusion 52 for contacting the ground. Thus, compared to a configuration where the narrow rib does not have the protrusion, configuration in order to make the narrow rib contact the ground when the tire is new is not necessary.

Note that in the pneumatic tire 1, the road contact surface 511 of the offset portion 51, when viewed as a cross-section in the tire meridian direction, has a predetermined width W4 (see FIG. 4). The width W4 is a width of a portion of the road contact surface 511 of the offset portion 51 that is substantially parallel to the profile of the shoulder land portion 33. Additionally, the width W4 is set based on a relationship between the width W2 of the narrow rib 5 and the width W3 of the top surface 521 of the protrusion 52, which is described hereinafter. Here, the width W4 preferably has a relationship with respect to the width W2 of the narrow rib 5 such that $0.1 \leq W4/W2 \leq 0.7$. Moreover, the width W4 is preferably within a range of 5 mm $\leq W4 \leq$ 11 mm. Thereby, the ground contact shape of the narrow rib 5 at an intermediate period of wear (see FIG. 5) is appropriately ensured. Note that the width W2 of the narrow rib 5 and the width W4 of the road contact surface 511 of the offset portion 51 are set having the edge portion on the outer side in the tire width direction of the road contact surface 511 of the offset portion 51 as a reference.

Additionally, the top surface 521 of the protrusion 52, when viewed as a cross-section in the tire meridian direction, has a predetermined width W3 (see FIG. 4). The width W3 is a width of a range of the top surface 521 of the protrusion 52 that is substantially matching or is substantially parallel with the profile of the shoulder land portion 33. Specifically, the width W3 preferably has a relationship with respect to the width W2 of the narrow rib 5 such that $0.10 \leq W3/W2 \leq 0.40$. Thereby, the ground contact state of the protrusion 52 is appropriately ensured. Note that in this embodiment, the width W3 is configured to be within a range of 1 mm $\leq W3 \leq$ 3 mm, and the width W2 of the narrow rib 5 is configured to be within a range of 8 mm $\leq W2 \leq$ 12 mm.

Additionally, in this embodiment, when viewed as a cross-section in the tire meridian direction, the protrusion 52 has a uniform rectangular cross-section or trapezoidal cross-section in the tire circumferential direction, and protrudes from the road contact surface 511 of the offset portion 51 in the tire radial direction (see FIG. 4). Therefore, the top surface 521 of the protrusion 52 is formed from a top side of the rectangular cross-section or the trapezoidal cross-section. Moreover, the top surface 521 of the protrusion 52 and the road contact surface 511 of the offset portion 51 are substantially parallel. In this configuration, the top surface 521 of the protrusion 52 has a planar form, which is preferable from the perspective of consistent ground contact. However, the present technology is not limited thereto, and when viewed as a cross-section in the tire meridian direction, the protrusion 52 may have a semicircular cross-section (see FIG. 6) or, alternately, may have a protruding form having an arc shaped top surface 521 (not illustrated). In this configuration as well, the distance δ between the top portion (top surface 521) of the protrusion 52 and the road contact surface 331 of the shoulder land portion 33 must be within the range $-0.5$ mm $\leq \delta \leq 0.5$ mm. Additionally, the width W3 of the top surface 521 of the protrusion 52 is a width of a peak portion where the distance δ from the road contact surface 331 of the shoulder land portion 33 is within the range $-0.5$ mm $\leq \delta \leq 0.5$ mm. Regarding the angle φ formed by the top portion (top surface 521) of the protrusion 52 and the road contact surface 331 of the shoulder land portion 33, the protrusion 52 has a semicircular or, alternately, an arc shaped top portion (top surface 521) and, therefore, will always have a line tangent to the road contact surface 331 of the shoulder land portion 33 such that the angle φ is 0.

Additionally, in this embodiment, the protrusion 52 is disposed on the edge portion on the inner side in the tire width direction of the offset portion 51 (see FIGS. 3 and 4). Therefore, a wall surface on the inner side in the tire width direction of the protrusion 52 is formed from a portion of a groove wall surface of the narrow groove 4. In this configuration, the more to the inner side in the tire width direction of the offset portion 51 that the protrusion 52 is positioned, the greater the ground contact pressure that acts on the protrusion 52 will be and, therefore, the protrusion 52 will proactively wear. Thereby, function of the narrow rib 5 as a wear sacrifice rib is enhanced. However, the present technology is not limited thereto, and the protrusion 52 may be disposed at a center portion in the tire width direction of the offset portion 51 (see FIG. 7), or may be disposed at an edge portion of an outer side in the tire width direction of the offset portion 51 (see FIG. 8). Note that with the configuration of FIG. 7, the width W3 of the offset portion 51 is defined as a total sum of widths of each of the road contact surfaces 511 and 511 that are divided on the protrusion 52.

Note that in the pneumatic tire 1, forms, dimensions, and the like of the narrow groove 4 and the narrow rib 5 described above are measured in a state where the tire is assembled on a standard rim, inflated to a prescribed internal pressure, and is in an unloaded state.

Herein, "standard rim" refers to an "application rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Also, "prescribed internal pressure" refers to the "maximum air pressure" defined by JATMA, the maximum value of "tire load limits at various cold inflation pressures" defined by TRA, or "inflation pressures" defined by ETRTO. Moreover, a "stipulated load" refers to "maximum load capacity" defined by JATMA, the maximum value in "tire load limits at various cold inflation pressures" defined by TRA, or "load capacity" defined by ETRTO. However, with JATMA, in the case of passenger car tires, the prescribed internal pressure is an air pressure of 180 kPa, and the stipulated load is 88% of the maximum load capacity.

Effects

As described above, the pneumatic tire 1 includes a plurality of circumferential main grooves 21 and 22 extending in a tire circumferential direction, a plurality of land portions 31 to 33 partitioned by the circumferential main grooves 21 and 22, a narrow groove 4 extending in the tire circumferential direction and disposed in an edge portion of a road contact surface 331 side and an outer side in the tire width direction of the shoulder land portion 33 on an outermost side in a tire width direction, and a narrow rib 5 that is partitioned by the narrow groove 4 (see FIGS. 2 and 3). Additionally, the narrow rib 5 includes an offset portion 51 having a road contact surface 511 offset inward in a tire radial direction from the road contact surface 331 of the shoulder land portion 33, and a protrusion 52 protruding in the tire radial direction from the offset portion 51, extending in the tire circumferential direction, and having a top surface 521 that is substantially flush with a profile line of the shoulder land portion 33.

With this configuration, the protrusion 52 of the narrow rib 5 contacts the ground under conditions when the tire is new and where the road contact surface 331 of the shoulder land portion 33 contacts the ground (see FIGS. 2 to 4). Thus, the protrusion 52 functions as a wear sacrifice rib and the functionality of the narrow rib 5 is ensured. This leads to the advantage that uneven wear of the shoulder land portion 33 at the initial period of wear is suppressed from when the tire is new.

Additionally, with the pneumatic tire 1, the width W2 of the narrow rib 5 and the width W1 of the road contact surface 331 of the shoulder land portion 33 have a relationship such that $0.20 \leq W2/W1 \leq 0.40$ (see FIG. 4). With this configuration, the width W2 of the narrow rib 5 is made appropriate and, therefore, function of the narrow rib 5 as a wear sacrifice rib is appropriately ensured. This leads to the advantage that uneven wear of the shoulder land portion 33 is appropriately suppressed.

Additionally, with the pneumatic tire 1, the width W3 of the top surface 521 of the protrusion 52 and the width W2 of the narrow rib 5 have a relationship such that $0.10 \leq W3/W2 \leq 0.40$ (see FIG. 4). With this configuration, the width W3 of the top surface 521 of the protrusion 52 is made appropriate and, therefore, function of the protrusion 52 as a wear sacrifice rib is appropriately displayed at an initial period of wear from when the tire is new. This leads to the advantage that uneven wear of the shoulder land portion 33 is appropriately suppressed.

Additionally, with the pneumatic tire 1, the distance δ between the top surface 521 of the protrusion 52 and the road contact surface 331 of the shoulder land portion 33 is within a range of $-0.5 \text{ mm} \leq \delta \leq 0.5 \text{ mm}$ (see FIG. 4). With this configuration, the top surface 521 of the protrusion 52 and the road contact surface 331 of the shoulder land portion 33 are substantially flush, and a position relationship thereof is made appropriate. This leads to the advantage that uneven wear of the shoulder land portion 33 is appropriately suppressed.

Additionally, with the pneumatic tire 1, an offset amount g between the road contact surface 511 of the offset portion 51 and the road contact surface 331 of the shoulder land portion 33 is within a range of $0.5 \text{ mm} \leq g \leq 3.0 \text{ mm}$ (see FIG. 4). With this configuration, the offset amount g of the road contact surface 511 of the offset portion 51 is made appropriate. This leads to the advantage that uneven wear of the shoulder land portion 33 after the intermediate period of wear is appropriately suppressed.

Additionally, with the pneumatic tire 1, a groove width d of the narrow groove 4 is within a range of $0.1 \text{ mm} \leq d \leq 4.0 \text{ mm}$; and a groove depth h of the narrow groove 4, with respect to a groove depth H of the circumferential main groove 22 partitioning the shoulder land portion 33, is within a range of $0.80 \leq h/H \leq 1.10$ (see FIG. 4). With this configuration, the relationship between the groove width d of the narrow groove 4 and the groove depth H of the circumferential main groove 22 is made appropriate, and this leads to the form of the shoulder land portion 33 being made appropriate. This leads to the advantage that uneven wear of the shoulder land portion 33 is appropriately suppressed.

Examples

FIGS. 9-10 are tables showing the results of performance testing of pneumatic tires according to embodiments of the present technology. In the examples, uneven wear resistance performance tests were performed on a plurality of varying pneumatic tires.

In the performance tests, pneumatic tires with a tire size of 295/75R22.5 were assembled on TRA defined standard rims; and a prescribed air pressure and load defined by TRA were applied to these pneumatic tires. Additionally, the pneumatic tires were mounted on the steering axle of a North American Class 8 2-DD test vehicle. Next, this test vehicle was driven for 100,000 miles (about 160,000 km) and, thereafter, area and depth of uneven wear that occurred in the shoulder land portion was measured. The index value of the pneumatic tire of the Conventional Example was set as the standard score (100) and an indexed evaluation based on these measurement results was performed. With this evaluation, larger numbers are more preferable.

The pneumatic tire 1 of Working Examples 1 to 16 had a tread pattern based on ribs and the shoulder land portion (shoulder rib) 33 had the narrow groove 4 and the narrow rib 5. Additionally, the narrow rib 5 had the offset portion 51 offset from the shoulder land portion 33, and the protrusion 52 protruding from the offset portion 51 (see FIGS. 2 and 3).

The pneumatic tire of Conventional Example 1 has a narrow groove and a narrow rib in a shoulder land portion, but the narrow rib is not offset from the shoulder land portion (not illustrated). The pneumatic tire of Conventional Example 2 has a narrow groove and a narrow rib in a shoulder land portion, and the narrow rib is offset from the shoulder land portion (not illustrated). However, the narrow rib does not have a protrusion.

Note that with these pneumatic tires, a width W1 of the shoulder land portion was W1=39 mm and a width W2 of the narrow rib was W2=12 mm.

As shown in the test results, in a comparison of the Working Examples 1 to 16 and the Conventional Examples 1 and 2, with the pneumatic tires 1 of Working Examples 1 to 16, it is clear that uneven wear resistance performance was enhanced. Additionally, in a comparison of Working Examples 1 to 3, it is clear that uneven wear resistance performance was enhanced due to making the ratio W3/W2 between the width W3 of the top surface 521 of the protrusion 52 and the width W2 of the narrow rib 5 appropriate. Moreover, in a comparison of Working Examples 1 and 4 and 5, it is clear that uneven wear resistance performance was enhanced due to making the offset amount g between the road contact surface 511 of the offset portion 51 and the road contact surface 331 of the shoulder land portion 33 appropriate. Furthermore, in a comparison of Working Examples 1 and 6 and 8, it is clear that uneven wear resistance performance was enhanced due to the top surface 521 of the protrusion 52 and the road contact surface 331 of the shoulder land portion 33 being flush ($\delta$=0). Additionally, in a comparison of Working Examples 1 and 7, it is clear that uneven wear resistance performance was enhanced due to positioning the protrusion 52 on the inner side in the tire width direction of the offset portion 51.

Moreover, in a comparison of Working Examples 1 and 9 and 10, it is clear that uneven wear resistance performance was enhanced due to making the ratio W2/W1 between the width W2 of the narrow rib and the width W1 of the road contact surface of the shoulder land portion appropriate. Furthermore, in a comparison of Working Examples 1 and 11 to 16, it is clear that uneven wear resistance performance was enhanced due to making the ratio W4/W2 between the predetermined width W4 and the width W2 of the narrow rib 5 appropriate.

What is claimed is:

1. A pneumatic tire comprising:
   a plurality of circumferential main grooves extending in a tire circumferential direction,
   a plurality of land portions partitioned by the circumferential main grooves,
   a narrow groove extending in the tire circumferential direction and disposed in an edge portion of a road contact surface side and an outer side in the tire width direction of a shoulder land portion on an outermost side in a tire width direction, and
   a narrow rib, as a wear sacrifice rib, that is partitioned by the narrow groove; wherein
   the narrow rib includes:
      an offset portion having a road contact surface offset inward in a tire radial direction from the road contact surface of the shoulder land portion, and
      a protrusion protruding in the tire radial direction from the offset portion, extending in the tire circumferential direction, and having a top surface that is substantially flush with a profile line of the shoulder land portion, wherein the protrusion is disposed on the edge portion on an inner side in the tire width direction of the offset portion.

2. The pneumatic tire according to claim 1, wherein a width W2 of the narrow rib and a width W1 of the road contact surface of the shoulder land portion have a relationship such that $0.20 \leq W2/W1 \leq 0.40$.

3. The pneumatic tire according to claim 1, wherein a width W3 of the top surface of the protrusion and a width W2 of the narrow rib have a relationship such that $0.10 \leq W3/W2 \leq 0.40$.

4. The pneumatic tire according to claim 1, wherein a distance $\delta$ between the top surface of the protrusion and the road contact surface of the shoulder land portion is within a range of $-0.5 \text{ mm} \leq \delta \leq 0.5 \text{ mm}$.

5. The pneumatic tire according to claim 1, wherein an offset amount g between the road contact surface of the offset portion and the road contact surface of the shoulder land portion is within a range of $0.5 \text{ mm} \leq g \leq 3.0 \text{ mm}$.

6. The pneumatic tire according to claim 1, wherein a groove width d of the narrow groove is within a range of $0.1 \text{ mm} \leq d \leq 4.0 \text{ mm}$; and a groove depth h of the narrow groove, with respect to a groove depth H of the circumferential main groove partitioning the shoulder land portion, is within a range of $0.80 \leq h/H \leq 1.10$.

7. The pneumatic tire according to claim 1, wherein a width W4 of a portion of the road contact surface of the offset portion that is substantially parallel to the profile of the shoulder land portion has a relationship with respect to a width W2 of the narrow rib such that $0.1 \leq W4/W2 \leq 0.7$.

8. The pneumatic tire according to claim 7, wherein the width W4 is within a range of $5 \text{ mm} \leq W4 \leq 11 \text{ mm}$.

9. The pneumatic tire according to claim 1, wherein a width W3 of the top surface of the protrusion is configured to be within a range of $1 \text{ mm} \leq W3 \leq 3 \text{ mm}$.

10. The pneumatic tire according to claim 1, wherein a width W2 of the narrow rib is configured to be within a range of $8 \text{ mm} \leq W2 \leq 12 \text{ mm}$.

11. The pneumatic tire according to claim 1, wherein the top surface of the protrusion has a planar form.

12. The pneumatic tire according to claim 1, wherein when viewed as a cross-section in the tire meridian direction, the protrusion has a semicircular cross-section.

13. The pneumatic tire according to claim 1, wherein when viewed as a cross-section in the tire meridian direction, the protrusion has an arc shaped top surface.

14. The pneumatic tire according to claim 1, wherein:
   a width W2 of the narrow rib and a width W1 of the road contact surface of the shoulder land portion have a relationship such that $0.20 \leq W2/W1 \leq 0.40$;
   a width W3 of the top surface of the protrusion and a width W2 of the narrow rib have a relationship such that $0.10 \leq W3/W2 \leq 0.40$; and
   a width W4 of a portion of the road contact surface of the offset portion that is substantially parallel to the profile of the shoulder land portion has a relationship with respect to a width W2 of the narrow rib such that $0.1 \leq W4/W2 \leq 0.7$.

15. The pneumatic tire according to claim 14, wherein:
   the width W2 of the narrow rib is within a range of $8 \text{ mm} \leq W2 \leq 12 \text{ mm}$;
   the width W3 of the top surface of the protrusion is within a range of $1 \text{ mm} \leq W3 \leq 3 \text{ mm}$; and
   the width W4 is within a range of $5 \text{ mm} \leq W4 \leq 11 \text{ mm}$.

16. The pneumatic tire according to claim 1, wherein a width W4 of a portion of the road contact surface of the offset portion that is substantially parallel to the profile of the shoulder land portion has a relationship with respect to a width W2 of the narrow rib such that $0.47 \leq W4/W2 \leq 0.7$.

17. The pneumatic tire according to claim 1, wherein a width W3 of the top surface of the protrusion and a width W2 of the narrow rib have a relationship such that $0.17 \leq W3/W2 \leq 0.25$.

18. The pneumatic tire according to claim 2, wherein a width W3 of the top surface of the protrusion and a width W2 of the narrow rib have a relationship such that $0.10 \leq W3/W2 \leq 0.40$.

19. The pneumatic tire according to claim 18, wherein a distance δ between the top surface of the protrusion and the road contact surface of the shoulder land portion is within a range of $-0.5 \text{ mm} \leq \delta \leq 0.5 \text{ mm}$.

20. The pneumatic tire according to claim 19, wherein an offset amount g between the road contact surface of the offset portion and the road contact surface of the shoulder land portion is within a range of $0.5 \text{ mm} \leq g \leq 3.0 \text{ mm}$.

21. The pneumatic tire according to claim 1, wherein when viewed as a cross-section in the tire meridian direction, the narrow groove inclines toward the outer side in the tire width direction in a groove depth direction.

* * * * *